May 31, 1960 J. M. RICKETTS 2,938,661
COMPRESSOR SEALS
Filed June 13, 1956

INVENTOR.
James M. Ricketts
BY Paul Fitzpatrick
ATTORNEY

United States Patent Office 2,938,661
Patented May 31, 1960

2,938,661
COMPRESSOR SEALS

James M. Ricketts, Oxford, Mich., assignor to General Motors Corporation, Detroit, Mich., a corporation of Delaware Filed June 13, 1956, Ser. No. 591,159

2 Claims. (Cl. 230—132)

My invention relates to improvements in seals for rotating machines and is particularly applicable to labyrinth seals for fluid dynamic machines such as air compressors and turbines. The invention is illustrated herein as embodied in the compressor of a gas turbine engine, which engine is described in U.S. patent application Serial No. 559,475 for Regenerative Gas Turbine of James M. Ricketts and others, filed January 16, 1956. As will be apparent, however, the invention is applicable to other installations.

In rotary compressors and turbines where the fluid passing through the machine, which will be referred to hereafter as air for convenience, is at low pressure at one end of the machine (the inlet of a compressor or discharge end of a turbine), oil may be drawn into the air path through the seals between the rotating and stationary parts of the machine at the low pressure end.

My invention relates to an improved arrangement for supplying air under pressure to a seal in such a location so that there is a higher pressure within the seal than in the adjacent spaces which may contain oil to prevent such leakage of oil into the machine.

The principal objects of the invention are to improve the performance of compressors and such machines, to prevent leakage or waste of oil or fouling of the machinery by such leaking oil, and to provide improved oil seals.

Figure 1:
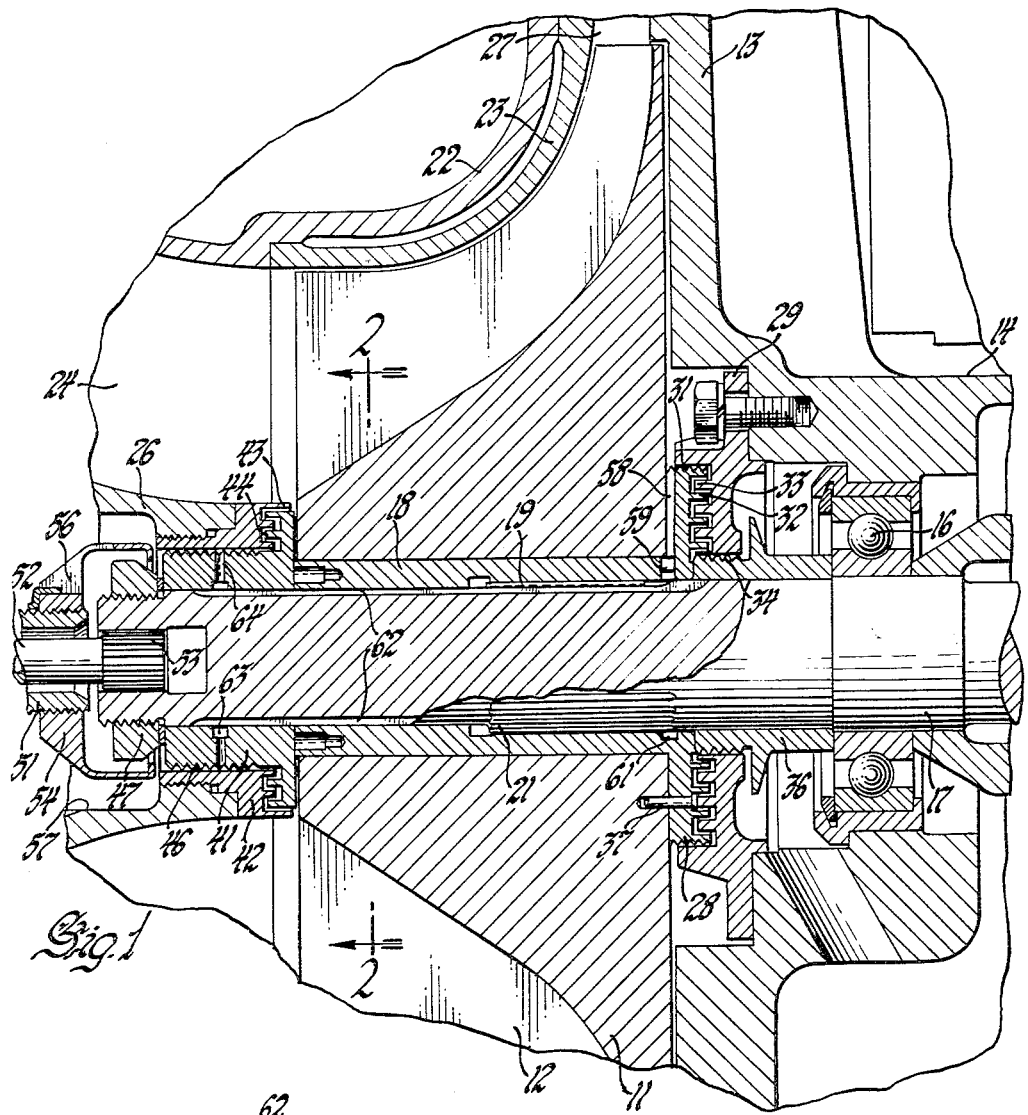
Figure 2:
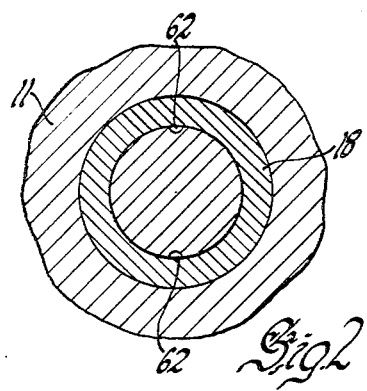

The nature of the invention and the advantages thereof will be clearly apparent to those skilled in the art from the succeeding detailed description of the preferred embodiment thereof and the accompanying drawings in which:

Fig. 1 is a partial sectional view of a compressor of the centrifugal type embodying the invention, the section being taken on a plane containing the axis of rotation of the compressor, and Fig. 2 is a fragmentary sectional view at right angles to the axis taken on the plane indicated by the line 2—2 in Fig. 1.

Referring to the drawings, the invention is shown as applied to a compressor including a rotor 11 having vanes 12 thereon, the rotor being of known type in which air enters axially at one end of the rotor and is discharged tangentially from the circumference of the rotor at the other end thereof. The rotor is mounted adjacent a rear casing plate 13 forming part of the stator of the compressor integral with a shaft support 14 within which is mounted a ball bearing 16 which rotatably supports the rotor shaft 17. Shaft 17 may be supported in an additional bearing in the support 14, which is not shown. The rotor is pressed or otherwise fixed on a sleeve 18, the forward portion of which is a sliding fit on shaft 17 and the rear portion of which is formed with internal splines 19 engaging external splines 21 on the shaft. The compressor stator, in addition to the rear plate 13, includes a front casing portion 22 and a liner or shroud 23. An entrance conduit 24 into the compressor is defined by the front case 22 and an annular bearing support or fairing member 26 supported in the center of the inlet. A discharge conduit 27 into a compressor diffuser (not shown) is defined between the shroud 23 and rear casing plate 13.

A labyrinth seal is provided at the discharge or high pressure end of the compressor between the rotor and the casing by a radially extending flange 28 on the sleeve 18 which abuts the rear face of the compressor rotor and a fixed seal ring 29 bolted to the shaft housing 14. The labyrinth seal is defined by a grooved surface 31 on the rim of flange 28, by axially projecting ribs 32 on flange 28 and interfitting ribs 33 on the seal plate 29, and by grooves 34 on a sleeve 36 mounted on the shaft which cooperate with the internal bore of seal plate 29. The seal plate may be rotatably coupled to the rotor by pins 37. The labyrinth seal 28, 29 minimizes leakage of air under pressure from the compressor outlet through the space between the rotor and plate 13 into the interior of shaft housing 14.

A labyrinth seal at the low pressure or inlet end of the compressor is provided by a seal ring 41 mounted on the shaft 17 abutting the forward end of sleeve 18 and a fixed seal ring 42 threaded into the inlet fairing 26. Axially extending ribs 43 on ring 42 and axially extending ribs 44 on ring 41 act as part of the labyrinth seal, the remainder of which is provided by the circumferential ribs 46 on the outer surface of ring 41 which are in close proximity to the inner surface of ring 42.

The bearing 16, sleeve 36, sleeve 18, and ring 41 are retained on shaft 17 by a nut 47. Shaft 17 is coupled to an accessory drive shaft 51 by a quill shaft 52 having external splines 53 received in a splined bore in the forward end of shaft 17. The coupling between the quill shaft 52 and accessory drive shaft 51 and the bearings which support shaft 51 are not illustrated. Oil is supplied through the hollow quill shaft from a source not shown to lubricate splines 53. This oil flows forwardly through the splines and escapes from the open end of the splined recess in shaft 17. An oil catcher ring 54 mounted on shaft 51 surrounds the open end of the shaft. This ring slides over nut 47 when the engine is assembled. It serves to aid in keeping the oil away from the labyrinth seal 41 and 42. Oil may escape from the catcher ring through an opening 56 into a chamber 57 from which it drains.

It will be understood that the region of the air inlet 24 adjacent the seal 43, 44 will ordinarily be at subatmospheric pressure when the compressor is operating. In the absence of special provisions to prevent it, there would be a tendency for air to be drawn from the chamber 57 through the labyrinth seal into the compressor inlet, which air would carry particles of oil. Oil thus introduced into the compressor is wasted and, more important, causes collection of dirt on the compressor rotor and thus lowers the efficiency of the compressor.

While it has been proposed to pressurize such seals to prevent this, previous arrangements of which I am aware have been clumsy and inconvenient and involved external piping to conduct air under pressure to the labyrinth seal. In the present invention, such expedients are dispensed with by a simple and convenient arrangement of an air passage through the rotor from the high pressure end to an intermediate point in the labyrinth seal. As shown on the drawings, the flange 28 of sleeve 18 has a groove 58 on its forward face which defines with the rear face of the rotor body 11 a radial passage leading from the high pressure area at the rear of the discharge end of the rotor through a port 59 into a groove 61 on the inner surface of the sleeve. Shaft 17 is machined to provide two longitudinal grooves 62 extending through the rotor. The rear portion of these grooves may constitute deepening of two of the spline grooves in the shaft or, if desired, the rear portion of the conduit may be defined by the clearances at the root or tip of the splines. The rear ends of grooves 62 communicate with the groove 61 and the forward end of grooves 62 communicate with an annular recess 63 in the inner surface of seal ring 41. Two or more radial passages 64 extend from recess 63 to a zone of the low pressure labyrinth seal intermediate the ends thereof. The air at the rear face of the compressor entering the passage 61 is above atmospheric pressure and thus flows through the passages 58, 59, 61, 62, 63, and 64 into the low pressure seal and flows both forwardly and rearwardly out of the seal. The forward flow through the forward part of the labyrinth seal prevents any suction of oil-laden air into the seal and thus prevents its entry into the air flow path through the compressor. The very small amount of air required to pressurize the seal has no significant effect on compressor efficiency.

Depending upon the pressure of the air available at the discharge end of the compressor, it may be desirable to tap the low pressure seal pressurizing air off an intermediate point of the high pressure point labyrinth seal in a manner similar to that in which the air is introduced to an intermediate point of the low pressure seal to reduce the pressure of the air thus supplied to the low pressure seal. However, in the centrifugal compressor illustrated, the pressure adjacent the shaft at the discharge end is not unduly high and the air may thus be taken from a point ahead of the high pressure labyrinth seal.

It will be apparent to those skilled in the art that the structure described is particularly adapted to perform the functions and attain the objects and advantages described, and its simplicity and convenience will be obvious.

The detailed description of the invention for the purpose of explaining the principles thereof is not to be construed as limiting or restricting the invention, as many modifications may be made by the exercise of skill in the art within the scope of the invention.

I claim:

1. A centrifugal compressor comprising, in combination, a rotor defining a fluid flow path entering the rotor at the low pressure end thereof and leaving the rotor at its periphery at the high pressure end thereof; a stator enclosing the rotor and defining a low pressure fluid entrance conduit to the low pressure end of the rotor and a high pressure fluid discharge space at the high pressure end of the rotor, the stator including a first portion adjacent the low pressure end of the rotor and a second portion lying closely adjacent the high pressure end of the rotor; a shaft supporting the rotor and rotatably mounted in the stator, the shaft extending through the rotor and into the said portions of the stator; a labyrinth seal between the rotor and the first portion of the stator at the low pressure end of the rotor; and a duct connected to an intermediate part of the labyrinth seal to supply fluid thereto under pressure above that of the fluid at the fluid entrance to pressurize the seal, the duct extending through the rotor to an intermediate part of the labyrinth seal and connecting to the space between the high pressure end of the rotor and the second portion of the stator adjacent the shaft.

2. A centrifugal compressor comprising, in combination, a rotor defining a fluid flow path entering the rotor at the low pressure end thereof and leaving the rotor at its periphery at the high pressure end thereof; a stator enclosing the rotor and defining a low pressure fluid entrance conduit to the low pressure end of the rotor and a high pressure fluid discharge space at the high pressure end of the rotor, the stator including a first portion adjacent the low pressure end of the rotor and a second portion lying closely adjacent the high pressure end of the rotor; a shaft supporting the rotor and rotatably mounted in the stator, the shaft extending through the rotor and into the said portions of the stator; a labyrinth seal between the rotor and the first portion of the stator at the low pressure end of the rotor; and a duct connected to an intermediate part of the labyrinth seal to supply fluid thereto under pressure above that of the fluid at the fluid entrance to pressurize the seal, the duct comprising grooves in the surface of the shaft extending through the rotor, passages connecting the grooves to an intermediate part of the labyrinth seal, and passages connecting the grooves to the space between the high pressure end of the rotor and the second portion of the stator adjacent the shaft.

References Cited in the file of this patent

UNITED STATES PATENTS

| | | |
|---|---|---|
| 2,259,361 | Vorkauf | Oct. 14, 1941 |
| 2,276,965 | Halliday | Mar. 17, 1942 |
| 2,555,492 | Kidney | June 5, 1951 |
| 2,632,395 | Jennings et al. | Mar. 24, 1953 |
| 2,704,516 | Mock et al. | Mar. 22, 1955 |